US012700726B2

(12) United States Patent
Hsu et al.

(10) Patent No.: US 12,700,726 B2
(45) Date of Patent: Aug. 4, 2026

(54) POWER SUPPLY PROTECTION CIRCUIT WITH SURGE SUPPRESSION AND METHOD THEREOF

(71) Applicant: ANPEC ELECTRONICS CORPORATION, Hsinchu (TW)

(72) Inventors: Chun-Kai Hsu, Hsinchu City (TW); Chih-Heng Su, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 169 days.

(21) Appl. No.: 18/822,657

(22) Filed: Sep. 3, 2024

(65) Prior Publication Data

US 2025/0392115 A1     Dec. 25, 2025

(30) Foreign Application Priority Data

Jun. 20, 2024    (TW) ................................. 113122773

(51) Int. Cl.
   *H02H 7/00*          (2006.01)
   *H02H 7/12*          (2006.01)
(52) U.S. Cl.
   CPC ................................. *H02H 7/1213* (2013.01)
(58) Field of Classification Search
   CPC ................................................... H02H 7/1213
   See application file for complete search history.

(56) References Cited

U.S. PATENT DOCUMENTS

| | | | | |
|---|---|---|---|---|
| 5,436,786 A | * | 7/1995 | Pelly ...................... | H02H 9/041 |
| | | | | 361/91.8 |
| 2013/0107579 A1 | * | 5/2013 | Hosotani ............. | H02M 3/3382 |
| | | | | 363/16 |
| 2021/0044199 A1 | * | 2/2021 | Kim ...................... | H02H 7/1213 |
| 2021/0257829 A1 | * | 8/2021 | Lau ...................... | H02M 1/0064 |
| 2022/0181963 A1 | * | 6/2022 | Deboy .................. | H02M 1/322 |
| 2022/0271658 A1 | * | 8/2022 | Wu ........................ | H02M 3/158 |

* cited by examiner

*Primary Examiner* — Stephen W Jackson
(74) *Attorney, Agent, or Firm* — Li & Cai Intellectual Property (USA) Office

(57)          ABSTRACT

A power supply protection circuit with surge suppression and a method thereof are provided. The power supply protection circuit used in the power converter includes a discharge circuit and a surge suppression circuit. The surge detection circuit determines whether the discharge conditions are compliant based on the control signal of the low-side switch in the power converter and the output voltage. When the discharge conditions are non-compliant, the surge detection circuit outputs a discharge signal to the discharge circuit, so that the discharge circuit discharges the output voltage. When the discharge conditions are determined to be non-compliant, the surge detection circuit stops outputting the discharge signal to the discharge circuit, so that the discharge circuit stops discharging the output voltage.

14 Claims, 5 Drawing Sheets

S301 — deactivating discharge circuit

S303
determining whether output voltage is greater than reference voltage

No

Yes

S305
determining whether conduction time of low-side switch in Nth cycle greater than that in N-1th cycle No Yes S307
conducting low-side switch No Yes activating discharge circuit — S309

POWER SUPPLY PROTECTION CIRCUIT WITH SURGE SUPPRESSION AND METHOD THEREOF

CROSS-REFERENCE TO RELATED PATENT APPLICATION

This application claims the benefit of priority to Taiwan Patent Application No. 113122773, filed on Jun. 20, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to power supply protection circuits, and more particularly to a power supply protection circuit with surge suppression and a method thereof.

BACKGROUND OF THE DISCLOSURE

Power converters are widely used power supply devices in current electronic products. For DC/DC power converters, the primary function is to convert DC input voltage into an output voltage suitable for the load. However, with increasing load demand and more stringent transient response requirements, the output voltage of power converters is raised due to surges generated during the transition from heavy load to light load, thus leading to mis-operation of circuit components within the power converter and even causing system anomalies.

SUMMARY OF THE DISCLOSURE

In response to the above-referenced technical inadequacies, the present disclosure provides a power supply protection circuit with surge suppression and a method thereof to address the shortcomings of the relevant art.

The present disclosure provides a power supply protection circuit with surge suppression to suppress surges in the output voltage of a power converter during load transitions. The power converter includes a high-side switch, a low-side switch, an inductor, and an output capacitor. A first end of the high-side switch receives the input voltage, the second end of the high-side switch is connected to the first end of the low-side switch, the first end of the inductor is connected to the second end of the high-side switch and the first end of the low-side switch, and the second end of the inductor is connected to the first end of the output capacitor. The high-side switch and the low-side switch are respectively controlled by the control circuit. The power supply protection circuit includes a discharge circuit and a surge detection circuit. The discharge circuit discharges the output voltage according to the discharge signal. The surge detection circuit is connected to the discharge circuit and determines whether the output voltage meets the discharge conditions based on the control signal of the low-side switch and the output voltage. When the discharge conditions are compliant, the surge detection circuit outputs a discharge signal to the discharge circuit, and when the discharge conditions are non-compliant, the surge detection circuit stops outputting the discharge signal to the discharge circuit. The discharge conditions include whether the output voltage is greater than a reference voltage, whether the control signal of the low-side switch is a conduction signal, and whether the conduction time of the low-side switch in the $N_{th}$ cycle is greater than the conduction time of the low-side switch in the N–1th cycle.

The present disclosure provides a power supply protection method with surge suppression to suppress surges in the output voltage of a power converter during load transitions. The power converter includes a high-side switch, a low-side switch, an inductor, and an output capacitor. The first end of the high-side switch receives the input voltage, the second end of the high-side switch is connected to the first end of the low-side switch, the first end of the inductor is connected to the second end of the high-side switch and the first end of the low-side switch, and the second end of the inductor is connected to the first end of the output capacitor. The high-side switch and the low-side switch are respectively controlled by the control circuit. The power supply protection method includes: determining whether the output voltage meets the discharge conditions based on the control signal of the low-side switch and the output voltage; and controlling the output voltage to discharge when the discharge conditions are compliant, and stopping the discharge of the output voltage when the discharge conditions are not met. The discharge conditions include whether the output voltage is greater than a reference voltage, whether the control signal of the low-side switch is a conduction signal, and whether the conduction time of the low-side switch in the $N_{th}$ cycle is greater than the conduction time of the low-side switch in the N–1$^{th}$ cycle.

In summary, the power supply protection circuit with surge suppression and a method thereof provided by the present disclosure can initiate discharge on the output voltage when the discharge conditions are compliant and stop the discharge on the output voltage when the discharge conditions are non-compliant, thereby ensuring the normal operation of the electronic components within the power converter.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
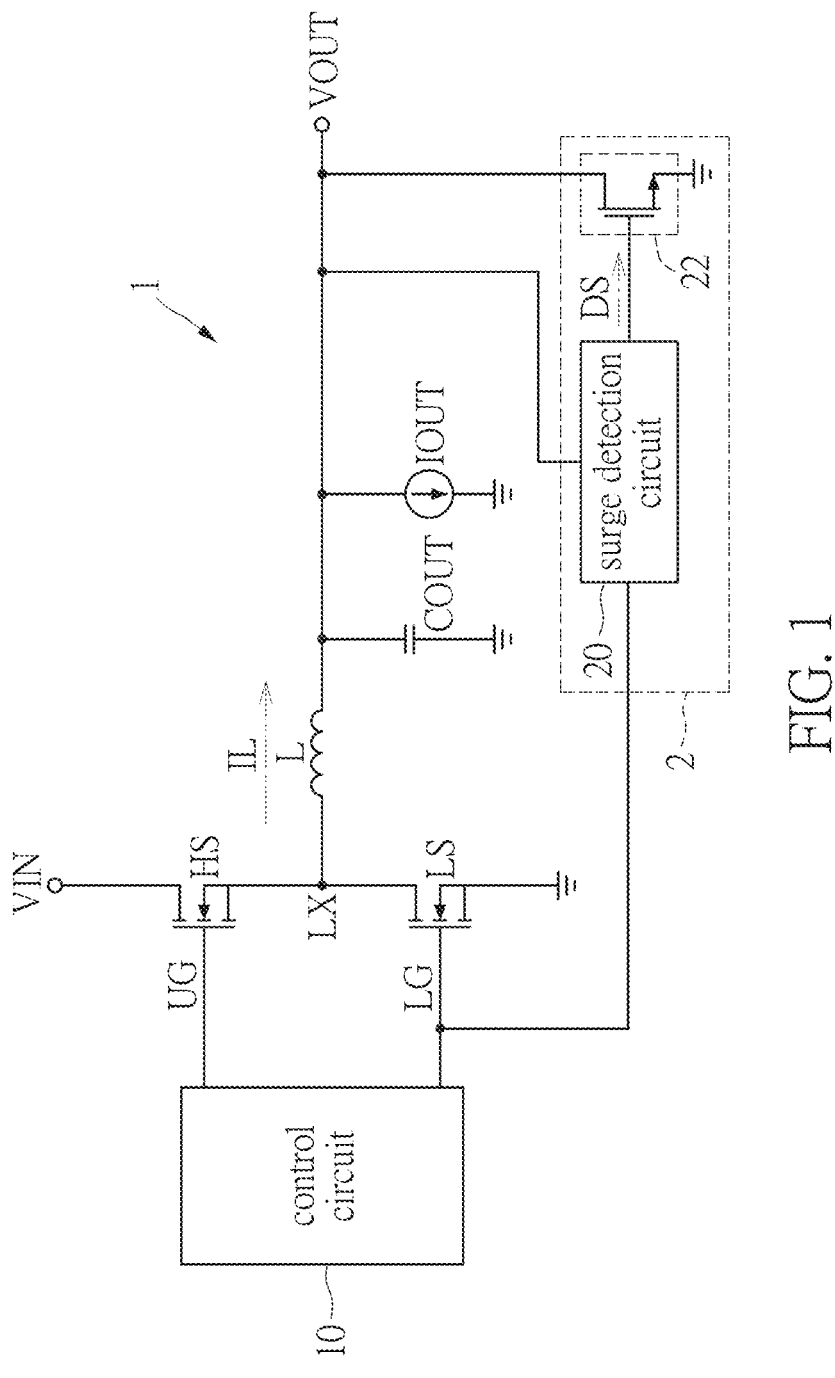
FIG. 1 is a circuit diagram of the power converter provided in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The embodiment of the present disclosure provides a power supply protection circuit with surge suppression. This power supply protection circuit can suppress surges in the output voltage of the power converter during load transitions. Specifically, the power converter is a DC/DC power converter, and the power supply protection circuit can determine whether to suppress voltage overshoots caused by transient changes in the output voltage of the DC/DC power converter based on whether the output voltage of the DC/DC power converter changes transiently (e.g., when the load state changes from heavy load to light load). The suppression method described here is to immediately discharge the voltage overshoot of the output voltage through a discharge circuit, thereby reducing the impact of the overshoot voltage on the output voltage and ensuring that the electronic components in the power converter can operate normally.

Embodiment of the Power Converter

Reference is made to FIG. 1, which is a system architecture diagram of the power converter provided in the embodiment of the present disclosure. The power converter 1 in this embodiment includes a high-side switch HS, a low-side switch LS, a control circuit 10, and a power supply protection circuit 2.

The first end of the high-side switch HS is connected to an input voltage source to receive an input voltage VIN from the input voltage source. The second end of the high-side switch HS is connected to the first end of the low-side switch LS. The control end of the high-side switch HS is controlled by the control circuit 10. The second end of the low-side switch LS is grounded, and the node LX between the first end of the low-side switch LS and the second end of the high-side switch HS is connected to the first end of an inductor L. The control end of the low-side switch LS is controlled by the control circuit 10.

The second end of the inductor L is connected to an energy storage circuit, and the energy storage circuit includes one or more output capacitors. In FIG. 1, one output capacitor COUT is illustrated, the first end of the output capacitor COUT is connected to the second end of the inductor L, and the second end of the output capacitor COUT is grounded. The node between the second end of the inductor L and the first end of the output capacitor COUT serves as the output end of the power converter 1, and the output voltage VOUT of the voltage output end of the power converter 1 can be provided to the load.

The control circuit 10 determines the output voltage based on operational requirements and controls the control ends of the high-side switch HS and the low-side switch LS through output control signals, thereby ensuring that the output voltage VOUT of the high-side switch HS and the low-side switch LS can be effectively maintained at the set voltage under the control.

In one embodiment, the control circuit 10 alternately switches the high-side switch HS and the low-side switch LS to control the output voltage VOUT.

For example, when the control circuit 10 alternately switches the high-side switch HS and the low-side switch LS to control the output voltage VOUT for providing a stable voltage supply to the load, if the load undergoes a transient change from heavy load to light load, it will cause the output voltage VOUT to be raised due to a surge during the transient response.

Accordingly, in this embodiment, the power supply protection circuit 2 is connected to the control end of the low-side switch LS and the output end of the power converter 1 to obtain the output voltage VOUT, and it is determined whether to discharge the output voltage of the power converter 1 by detecting the control signal of the low-side switch LS and the output voltage VOUT. Specifically, the power supply protection circuit 2 can determine whether the output voltage VOUT will be raised due to a surge when the load changes from heavy load to light load. If the power supply protection circuit 2 determines that the output voltage VOUT will be raised due to a surge when the load changes from heavy load to light load, the output voltage VOUT can be discharged to suppress the surge; otherwise, the output voltage VOUT will not be discharged.

For example, the power supply protection circuit determines whether the output voltage VOUT is raised due to a surge based on whether a discharge condition is met. In one embodiment, the discharge condition includes whether the output voltage VOUT is greater than a reference voltage, whether the control signal of the low-side switch LS is a conduction signal, and whether the conduction time of the low-side switch LS in the $N^{th}$ cycle is greater than the conduction time in the $N-1^{th}$ cycle. If the conditions are all met, the discharge condition is deemed satisfied.

Regarding the possible implementation of the power supply protection circuit 2, as shown in FIG. 1, the power supply protection circuit 2 includes a surge detection circuit 20 and a discharge circuit 22. The surge detection circuit 20 is connected to the control end of the low-side switch LS, the voltage output end of the power converter 1, and the discharge circuit 22. The discharge circuit 22 is connected to the voltage output end of the power converter 1.

In one embodiment, the surge detection circuit 20 determines whether the output voltage meets a discharge condition based on the control signal of the low-side switch LS and the output voltage VOUT. When the discharge condition is met, the surge detection circuit 20 outputs a discharge signal DS to the discharge circuit 22. When the discharge condition is not met, the surge detection circuit 20 stops outputting the discharge signal DS to the discharge circuit 22. The discharge circuit 22 discharges the output voltage VOUT when receiving the discharge signal DS, and stops discharging the output voltage VOUT when the discharge signal DS is not received.

In one embodiment, the discharge circuit 22, for example, is a switch. The first end of the switch is connected to the voltage output end of the power converter 1, and the second end of the switch 22 is grounded. The control end of the switch 22 is used to receive the discharge signal DS output by the surge detection circuit 20. The switch 22 is turned on when the discharge signal DS is received to allow the output voltage VOUT to discharge directly to the ground via the switch 22. The switch 22 is, for example, a MOS switch element.

In one embodiment, when the surge detection circuit 20 determines that all the conditions are met, such as the output voltage VOUT being greater than the reference voltage, the control signal of the low-side switch LS being a conduction signal, and the conduction time of the low-side switch LS in the $N^{th}$ cycle being greater than the conduction time of the low-side switch LS in the $N-1^{th}$ cycle, it can be concluded that the discharge conditions are compliant. Consequently, the discharge signal DS is output to the discharge circuit 22. Conversely, if any one of the conditions is not met, such as the output voltage VOUT not bing greater than the reference voltage, the control signal of the low-side switch LS not being a conduction signal, or the conduction time of the low-side switch LS in the $N^{th}$ cycle not being greater than the conduction time in the $N-1^{th}$ cycle, the discharge conditions are non-compliant, and thus no discharge signal DS is output to the discharge circuit 22.

Figure 2:
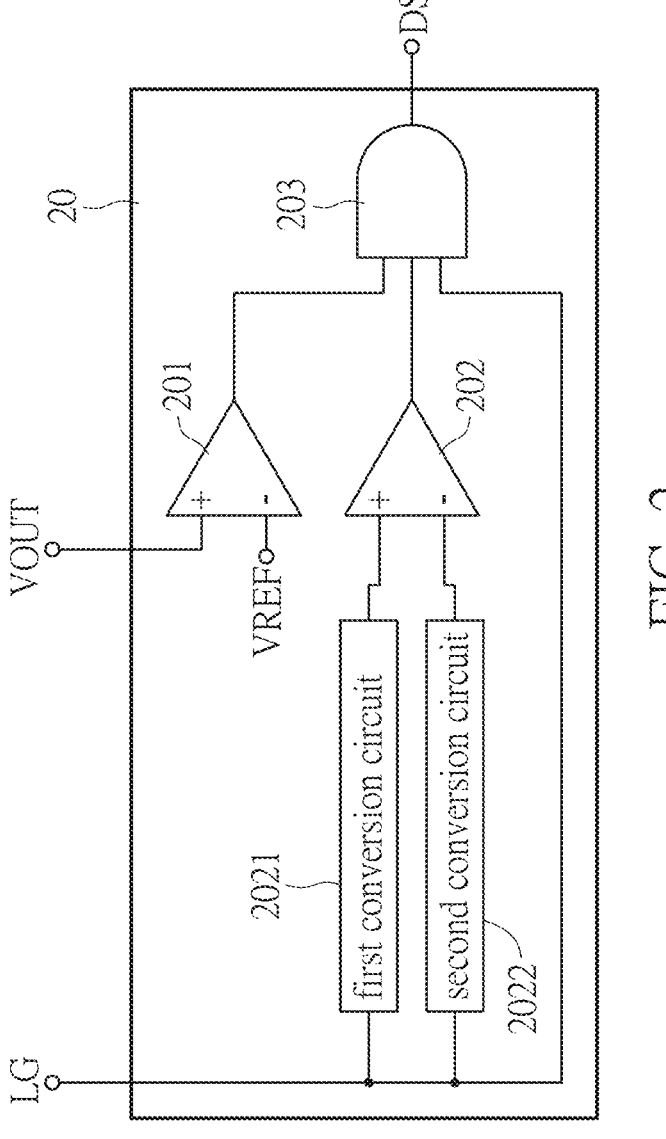
FIG. 2 is a schematic diagram of the surge detection circuit provided in one embodiment of the present disclosure.

Reference is made to FIG. 2, which is a schematic diagram of the surge detection circuit provided in the embodiment of the present disclosure. In the present disclosure, the surge detection circuit 20 includes, for example, a first comparator 201, a second comparator 202, and a logic circuit 203. The non-inverting input end of the first comparator 201 is connected to the voltage output end of the power converter 1 to receive the output voltage VOUT, while the inverting input end of the first comparator 201 receives the reference voltage VREF.

Furthermore, the second comparator 202 can be used to compare whether the conduction time of the low-side switch LS in the $N^{th}$ cycle is greater than the conduction time of the low-side switch LS in the $N-1^{th}$ cycle. For instance, the non-inverting input end of the second comparator 202 receives the comparison signal corresponding to the conduction time of the low-side switch LS in the $N^{th}$ cycle, while the inverting input end of the second comparator 202 receives the comparison signal corresponding to the conduction time of the low-side switch LS in the $N-1^{th}$ cycle. The conduction time of the low-side switch LS in the $N^{th}$ cycle can be considered the first energy release time, which is the energy release time of the inductor L during the $N^{th}$ conduction cycle of the low-side switch LS. Similarly, the conduction time of the low-side switch LS in the $N-1^{th}$ cycle can be considered the second energy release time, which is the energy release time of the inductor L during the $N-1^{th}$ conduction cycle of the low-side switch LS.

In one embodiment, the non-inverting input end of the second comparator 202 is connected to the output end of the first conversion circuit 2021, and the input end of the first conversion circuit 2021 is connected to the control end of the low-side switch LS to receive the control signal of the low-side switch LS. The inverting input end of the second comparator 202 is connected to the output end of the second conversion circuit 2022, and the input end of the second conversion circuit 2022 is connected to the control end of the low-side switch LS to receive the control signal of the low-side switch LS.

In one embodiment, the first conversion circuit 2021 can count and convert the conduction time of the low-side switch LS in the $N^{th}$ cycle into a first comparison signal (e.g., the first release voltage) for the second comparator 202 to compare. Similarly, the second conversion circuit 2022 can count and convert the conduction time of the low-side switch LS in the $N-1^{th}$ cycle into a second comparison signal (e.g., the second release voltage) for the second comparator 202 to compare.

Therefore, when the comparison result of the second comparator 202 is that the first comparison signal (or the first release voltage) is greater than the second comparison signal (or the second release voltage), the surge detection circuit 20 can determine that the conduction time of the low-side switch LS in the $N^{th}$ cycle is greater than the conduction time of the low-side switch LS in the $N-1^{th}$ cycle. On the other hand, when the comparison result of the second comparator 202 is that the first comparison signal (or the first release voltage) is not greater than the second comparison signal (or the second release voltage), the surge detection circuit 20 can determine that the conduction time of the low-side switch LS in the $N^{th}$ cycle is not greater than the conduction time of the low-side switch LS in the $N-1^{th}$ cycle.

In one embodiment, the first conversion circuit 2021 can sample a voltage during the conduction time of the low-side switch LS in the $N^{th}$ cycle to obtain the first release voltage, while the second conversion circuit 2022 can sample a voltage during the conduction time of the low-side switch LS in the $N-1^{th}$ cycle to obtain the second release voltage. The sampled voltage can be the control signal of the low-side switch, and the second conversion circuit 2022 has a holding function to maintain the second release voltage for a period of time to compare the second release voltage with the first release voltage later.

In one embodiment, the conduction time of the low-side switch LS in the $N^{th}$ cycle can reflect the energy release time of the inductor L during the second half of the $N^{th}$ cycle when the low-side switch LS is in conduction, while the conduction time of the low-side switch LS in the $N-1^{th}$ cycle can reflect the energy release time of the inductor L during the second half of the $N-1^{th}$ cycle when the low-side switch LS is on in conduction.

In one embodiment, the logic circuit 203 is connected to the output end of the first comparator 201, the output end of the second comparator 202, and the control signal of the low-side switch LS. The logic circuit 203 outputs a discharge signal DS to the discharge circuit 22 when the output voltage VOUT is greater than the reference voltage VREF, the control signal of the low-side switch LS is a conduction signal, and the conduction time of the low-side switch LS in the $N^{th}$ cycle is greater than the conduction time of the low-side switch LS in the $N-1^{th}$ cycle. For example, the logic circuit 203 can be an AND gate, and the characteristic of the AND gate can ensure that the discharge signal is only output when all the conditions for discharging are met, and the discharge signal is stopped from outputting when any of the conditions are not met.

Embodiment of Controlling the Power Protection Circuit

Figure 3:
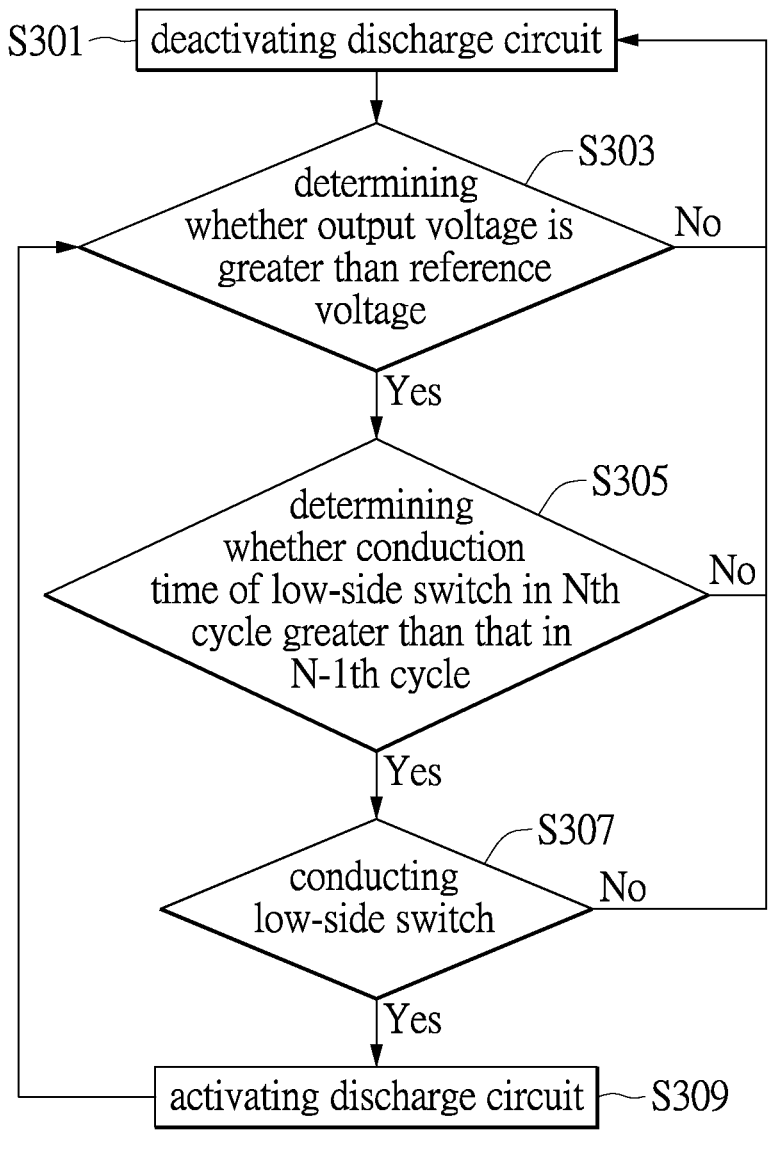
FIG. 3 is a control flowchart of the power supply protection circuit provided in one embodiment of the present disclosure.

Reference is made to FIG. 3, which is a flowchart of the control of the power protection circuit provided in the embodiment of the present disclosure. The process shown in FIG. 3 includes but is not limited to the following steps, and may also be referenced in conjunction with the structures shown in FIGS. 1 and 2.

In S301, deactivating the discharge circuit 22. When the power converter 1 is in a steady state, the output voltage VOUT of the power converter 1 can be stably output. At this time, the power protection circuit 2, based on the operating state of the power converter 1, does not meet the discharge conditions, so that the discharge circuit 22 is closed and does not discharge the output voltage VOUT of the power converter 1.

In S303, it is determined whether the output voltage VOUT is greater than the reference voltage VREF. The surge detection circuit 20 in the power protection circuit 2 can determine whether there is a surge by determining the output voltage VOUT of the power converter 1. For example, when the output voltage VOUT is greater than the reference voltage VREF, it can be concluded that a surge might be occurring. In the present disclosure, the reference voltage VREF is explained as being greater than the normal output voltage VOUT of the power converter 1. If the result of the determination made in S303 is yes, S305 is executed; if the result of the determination made in S303 is no, S301 is executed.

In S305, it is determined whether the conduction time of the low-side switch LS in the $N^{th}$ cycle is greater than the conduction time of the low-side switch LS in the N–$1^{th}$ cycle. If S303 is determined to be yes, the surge detection circuit 20 in the power protection circuit 2 can further determine the conduction time of the low-side switch LS in the power converter 1. For example, the conduction time of the low-side switch LS in two adjacent conduction cycles is determined, and if the conduction time in the current conduction cycle is greater than that in the previous conduction cycle, S307 is executed; if the result of the determination made in S305 is no, S301 is executed.

In S307, it is determined whether the control signal of the low-side switch LS is a conduction signal. If S305 is determined to be yes, the surge detection circuit 20 in the power protection circuit 2 further determines whether the control signal of the low-side switch LS in the power converter 1 is a conduction signal. When the control signal of the low-side switch LS is a conduction signal, it can be concluded that the output inductor L of the power converter 1 is in the discharge cycle. If the result of the determination made in S307 is yes, S309 is executed; if the result of the determination made in S303 is no, S301 is executed.

In S309, the discharge circuit 22 is activated. When the surge detection circuit 20 in the power protection circuit 2 completes the determination conditions of S303, S305, and S307, it can be concluded that the discharge conditions are compliant. Therefore, the surge detection circuit 20 outputs the discharge signal DS to the discharge circuit 22, so that the discharge circuit 22, after receiving the discharge signal DS, can immediately discharge the output voltage VOUT of the power converter 1 while the power protection circuit 2 returns to S303 to continue execution.

It should be noted that in S303, S305, and S307 of FIG. 3, if any of the determination conditions are not met, the power protection circuit 2 will determine that the discharge conditions are non-compliant, and the discharge circuit 22 will stop discharging.

In one embodiment, the execution order of S303, S305, and S307 is interchangeable.

Figure 4:
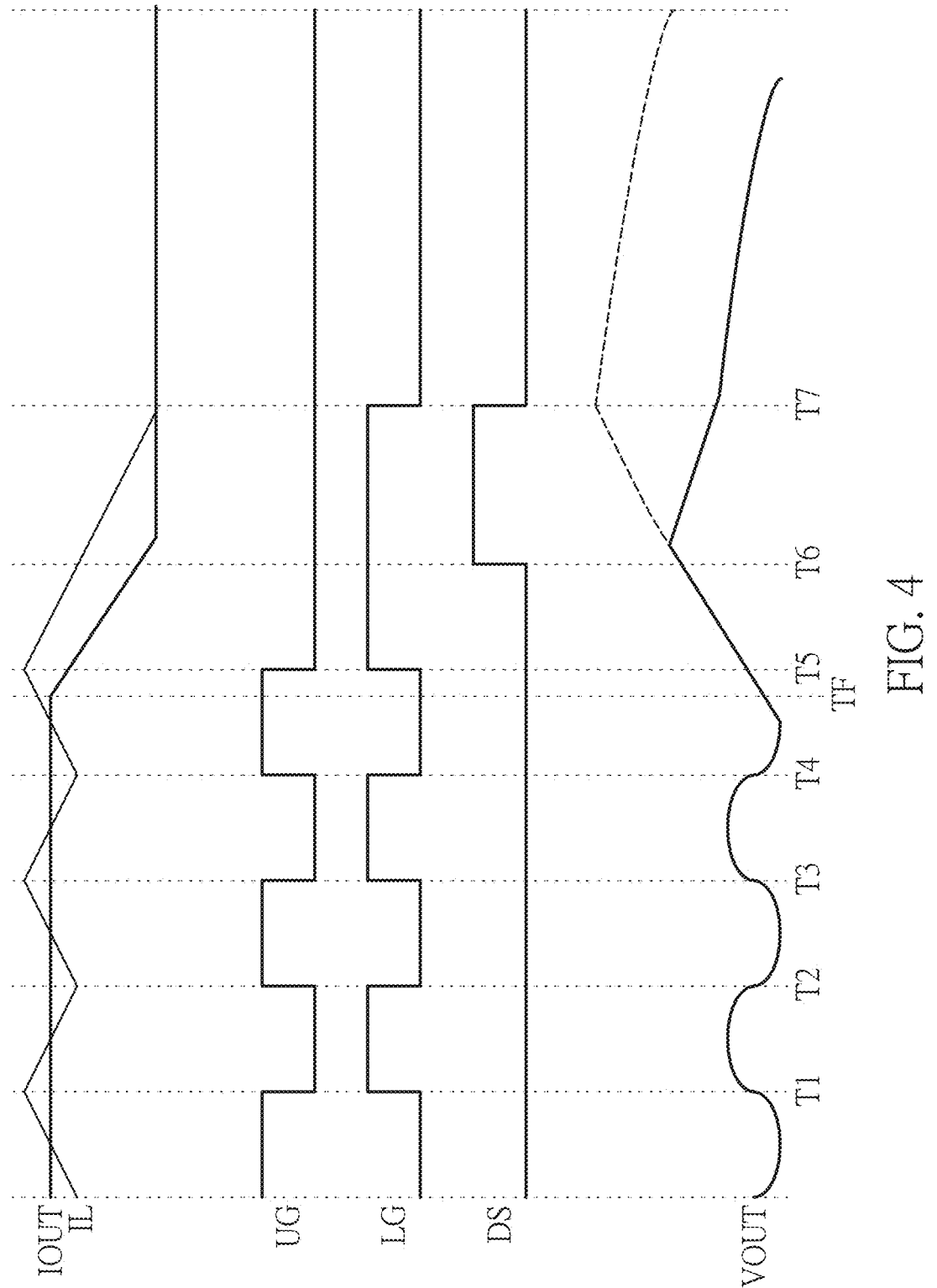
FIG. 4 is a control waveform diagram related to the power converter provided in one embodiment of the present disclosure.
Figure 5:
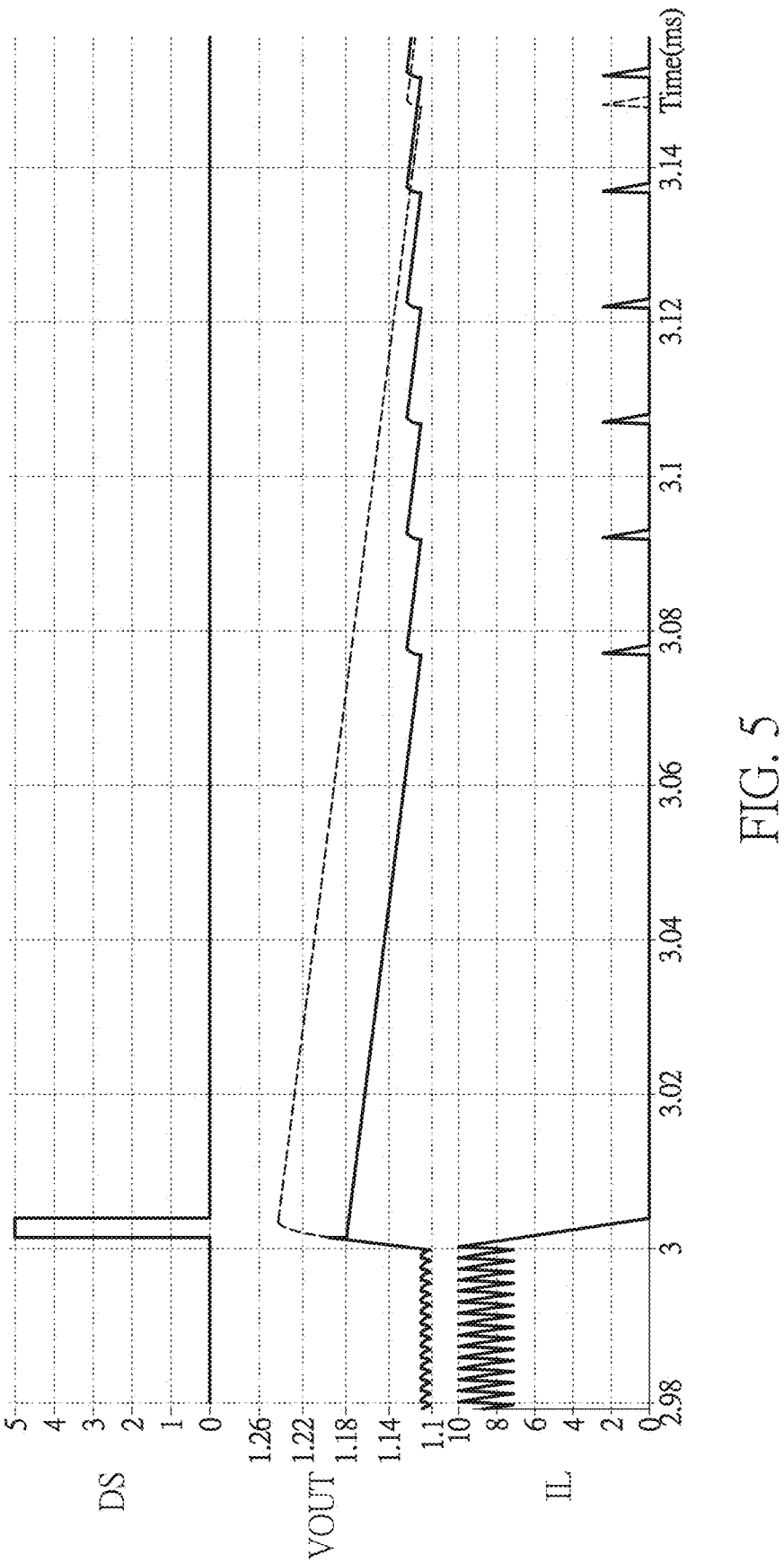
FIG. 5 is a waveform diagram related to the discharge signal of the power converter provided in one embodiment of the present disclosure.

Reference is made to FIG. 4 and FIG. 5. FIG. 4 is a control waveform diagram related to the power converter provided in the embodiment of the present disclosure, and FIG. 5 is a waveform diagram related to the discharge signal of the power converter provided in the embodiment of the present disclosure.

In FIG. 4, IL represents the current change of the inductor L in the power converter 1 shown in FIG. 1, IOUT represents the output current of the power converter 1, and the dashed lines in the output voltage VOUT in FIGS. 4 and 5 represent the voltage changes of a traditional power converter. As can be seen from FIG. 4, after time TF, when the load changes from a heavy load to a light load (at this time, the output current IOUT decreases), the output voltage VOUT of the traditional power converter, as indicated by the dashed lines, is raised by the surge. In contrast, the present disclosure can achieve the effect of suppressing surges through the power protection circuit 2. As shown by the solid line voltage change of the output voltage VOUT in FIGS. 4 and 5, the surge is effectively suppressed to prevent the output voltage from being significantly raised by the surge.

Furthermore, the surge detection circuit 20 in the power protection circuit 2, after time T6 in FIG. 4, determines that the discharge condition is met. At this time, it is determined that the output voltage VOUT is greater than the reference voltage VREF, the control signal of the low-side switch LS is a conduction signal, and all conditions that the conduction time of the low-side switch LS in the $N^{th}$ cycle (such as the time from T5 to T7 in FIG. 4) is greater than the conduction time of the low-side switch LS in the N–$1^{th}$ cycle (such as the time from T3 to T4 in FIG. 4) are met. Therefore, as shown in FIGS. 4 and 5, when the surge detection circuit 20 determines that the discharge condition is met, it outputs a high-level discharge signal DS (such as the time from T6 to T7 in FIG. 4) to allow the discharge circuit 22 to discharge the solid-line voltage of the output voltage VOUT.

In one embodiment, regarding how the surge detection circuit 20 determines whether the conduction time of the low-side switch LS in the $N^{th}$ cycle is greater than the conduction time of the low-side switch LS in the N–$1^{th}$ cycle, FIG. 4 is used as an example, where the control signal of the high-side switch HS is UG, and the control signal of the low-side switch LS is LG. The low-side switch LS is in the conduction cycle between time T1 and T2, T3 and T4, and T5 and T7, during which the low-side switch LS can release the energy of the inductor L.

For example, in the conduction cycle between time T1 and T2, and between time T3 and T4, the conduction times of the low-side switch LS are equal. Therefore, the surge detection circuit 20 determines that the conduction time of the low-side switch LS in the cycle from T3 to T4 is not greater than the conduction time of the low-side switch LS in the cycle from T1 to T2.

However, in the conduction cycle between time T3 and T4, and between T5 and T7, the conduction times of the low-side switch LS are not equal. For example, the conduction time of the low-side switch LS in the conduction cycle between T5 and T7 is greater than the conduction time of the low-side switch LS in the conduction cycle between T3 and T4. The first conversion circuit 2021 of the surge detection circuit 20 can sample a voltage to charge during the conduction time of the low-side switch LS in the T5 to T7 cycle to obtain the first release voltage, and the second conversion circuit 2022 of the surge detection circuit 20 can sample a voltage to charge during the conduction time of the low-side switch LS in the T3 to T4 cycle to obtain the second release voltage. Since the conduction time of the low-side switch LS in the T5 to T7 cycle is greater than the conduction time of the low-side switch LS in the T3 to T4 cycle, the first release voltage will be greater than the second release voltage.

Therefore, the surge detection circuit 20 can determine that the conduction time of the low-side switch LS in the $N^{th}$ cycle (such as the time from T5 to T7 in FIG. 4) is greater than the conduction time of the low-side switch LS in the $N–1^{th}$ cycle (such as the time from T3 to T4 in FIG. 4), which indicates a long-term decrease in the inductor current IL. Combined with the fact that the output voltage VOUT is greater than the reference voltage VREF and the control signal of the low-side switch LS is a conduction signal, the discharge circuit 22 can discharge the output voltage VOUT through the conduction of the discharge signal DS after time T6.

Beneficial Effects of the Embodiments

The power protection circuit with surge suppression and a method thereof provided by the present disclosure can activate the discharge circuit to discharge the output voltage when the discharge condition is met, and stop discharging the output voltage when the discharge condition is not met, thereby ensuring the normal operation of electronic components in the power converter.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power supply protection circuit with surge suppression for suppressing surges in an output voltage of a power converter during load transitions, wherein the power converter includes a high-side switch, a low-side switch, an inductor, and an output capacitor, a first end of the high-side switch receives an input voltage, a second end of the high-side switch is connected to a first end of the low-side switch, a first end of the inductor is connected to the second end of the high-side switch and the first end of the low-side switch, a second end of the inductor is connected to a first end of the output capacitor, the high-side switch and the low-side switch are respectively controlled by a control circuit, and the power supply protection circuit includes:

a discharge circuit configured to discharge the output voltage based on a discharge signal; and a surge detection circuit connected to the discharge circuit, wherein the surge detection circuit determines whether the output voltage meets a discharge condition based on a control signal of the low-side switch and the output voltage;

wherein, when the discharge condition is met, the surge detection circuit outputs the discharge signal to the discharge circuit, and when the discharge condition is not met, the surge detection circuit stops outputting the discharge signal to the discharge circuit;

wherein the discharge condition is whether the output voltage is greater than a reference voltage, whether the control signal of the low-side switch is a conduction signal, and whether a conduction time of the low-side switch in a $N^{th}$ cycle is greater than a conduction time of the low-side switch in a $N–1^{th}$ cycle.

2. The power supply protection circuit according to claim 1, wherein the discharge condition being met is the surge detection circuit determining that the output voltage is greater than the reference voltage, the control signal of the low-side switch is a conduction signal, and the conduction time of the low-side switch in the $N^{th}$ cycle is greater than the conduction time of the low-side switch in the $N–1^{th}$ cycle.

3. The power supply protection circuit according to claim 2, wherein the surge detection circuit includes a first comparator, a non-inverting input end of the first comparator receives the output voltage, and an inverting input end of the first comparator receives the reference voltage.

4. The power supply protection circuit according to claim 3, wherein the surge detection circuit further includes a second comparator, the second comparator compares whether the conduction time of the low-side switch in the $N^{th}$ cycle is greater than the conduction time of the low-side switch in the $N–1^{th}$ cycle.

5. The power supply protection circuit according to claim 4, wherein a non-inverting input end of the second comparator receives a comparison signal corresponding to the conduction time of the low-side switch in the $N^{th}$ cycle, and an inverting input end of the second comparator receives another comparison signal corresponding to the conduction time of the low-side switch in the $N–1^{th}$ cycle, the conduction time of the low-side switch in the $N^{th}$ cycle is an energy release time of the inductor during a $N^{th}$ conduction cycle of the low-side switch, and the conduction time of the low-side switch in the $N–1^{th}$ cycle is an energy release time of the inductor during a $N–1^{th}$ conduction cycle of the low-side switch.

6. The power supply protection circuit according to claim 4, wherein the surge detection circuit further includes a first conversion circuit and a second conversion circuit, an input end of the first conversion circuit is connected to the control end of the low-side switch, an output end of the first conversion circuit is connected to the non-inverting input end of the second comparator, the first conversion circuit counts and converts the conduction time of the conduction signal of the low-side switch in the $N^{th}$ cycle into a first comparison signal for comparison by the second comparator, an input end of the second conversion circuit is connected to the control end of the low-side switch, an output end of the second conversion circuit is connected to the inverting input end of the second comparator, the second conversion circuit counts and converts the conduction time of the conduction signal of the low-side switch in the $N–1^{th}$ cycle into a second comparison signal for comparison by the second comparator, and the conduction time of the low-side switch in the $N^{th}$ cycle is greater than the conduction time of the low-side switch in the $N–1^{th}$ cycle when the first comparison signal is greater than the second comparison signal.

7. The power supply protection circuit according to claim 4, wherein the surge detection circuit further includes a logic circuit, the logic circuit is connected to the output end of the first comparator, the output end of the second comparator, and the control signal of the low-side switch, and the logic circuit outputs the discharge signal when the output voltage is greater than the reference voltage, the control signal of the low-side switch is a conduction signal, and the conduction time of the low-side switch in the $N^{th}$ cycle is greater than the conduction time of the low-side switch in the $N-1^{th}$ cycle.

8. The power supply protection circuit according to claim 7, wherein the logic circuit is an AND gate.

9. The power supply protection circuit according to claim 1, wherein the discharge circuit includes a switch, and the switch conducts and discharges the output voltage to ground when receiving the discharge signal.

10. A method of power supply protection circuit with surge suppression for suppressing surges in an output voltage of a power converter during load transitions, wherein the power converter includes a high-side switch, a low-side switch, an inductor, and an output capacitor, a first end of the high-side switch receives an input voltage, a second end of the high-side switch is connected to a first end of the low-side switch, a first end of the inductor is connected to the second end of the high-side switch and the first end of the low-side switch, a second end of the inductor is connected to a first end of the output capacitor, the high-side switch and the low-side switch are respectively controlled by a control circuit, and the power supply protection method includes:

determining whether the output voltage meets a discharge condition based on the control signal of the low-side switch and the output voltage; and controlling the output voltage to discharge when the discharge condition is met, and stopping the output voltage from discharging when the discharge condition is not met;

wherein the discharge condition is whether the output voltage is greater than a reference voltage, whether the control signal of the low-side switch is a conduction signal, and whether a conduction time of the low-side switch in a $N^{th}$ cycle is greater than a conduction time of the low-side switch in a $N-1^{th}$ cycle.

11. The method according to claim 10, wherein the discharge condition being met is the output voltage being greater than the reference voltage, the control signal of the low-side switch being a conduction signal, and the conduction time of the low-side switch in the $N^{th}$ cycle being greater than the conduction time of the low-side switch in the $N-1^{th}$ cycle.

12. The method according to claim 11, wherein the conduction time of the low-side switch in the $N^{th}$ cycle is an energy release time of the inductor during a $N^{th}$ conduction cycle of the low-side switch, and the conduction time of the low-side switch in the $N-1^{th}$ cycle is an energy release time of the inductor during a $N-1^{th}$ conduction cycle of the low-side switch.

13. The method according to claim 11, further including: counting and converting the conduction time of the conduction signal of the low-side switch in the $N^{th}$ cycle into a first comparison signal, and counting and converting the conduction time of the conduction signal of the low-side switch in the $N-1^{th}$ cycle into a second comparison signal, wherein the conduction time of the low-side switch in the $N^{th}$ cycle is greater than the conduction time of the low-side switch in the $N-1^{th}$ cycle when the first comparison signal is greater than the second comparison signal.

14. The method according to claim 10, further including: stopping the output voltage from discharging when the output voltage is less than the reference voltage, the control signal of the low-side switch is a non-conduction signal, or the conduction time of the low-side switch in the $N^{th}$ cycle is not greater than the conduction time of the low-side switch in the $N-1^{th}$ cycle.

* * * * *